(12) United States Patent
Faist et al.

(10) Patent No.: US 6,761,112 B2
(45) Date of Patent: Jul. 13, 2004

(54) FIXING DEVICE

(75) Inventors: Bernd Klaus Faist, Ochsenfurt (DE); Wolfgang Otto Reder, Veitshöchheim (DE); Georg Schneider, Würzburg (DE)

(73) Assignee: Koenig & Bauer Aktiengesellschaft, Wurzburg (DE)

(*) Notice: Subject to any disclaimer, the term of this patent is extended or adjusted under 35 U.S.C. 154(b) by 0 days.

(21) Appl. No.: 10/451,627

(22) PCT Filed: Jan. 19, 2002

(86) PCT No.: PCT/DE02/00166

§ 371 (c)(1), (2), (4) Date: Jul. 8, 2003

(87) PCT Pub. No.: WO02/074541

PCT Pub. Date: Sep. 26, 2002

(65) Prior Publication Data

US 2004/0050274 A1 Mar. 18, 2004

(30) Foreign Application Priority Data

Mar. 20, 2001 (DE) .......................................... 101 13 314

(51) Int. Cl.⁷ ................................................ B41F 13/24
(52) U.S. Cl. ....................................... 101/247; 101/480
(58) Field of Search ................................ 101/247, 480, 101/486, 212, 216, 483, 352

(56) References Cited

U.S. PATENT DOCUMENTS

| | | | | |
|---|---|---|---|---|
| 3,331,482 A | * | 7/1967 | Keramas | 192/95 |
| 4,381,707 A | | 5/1983 | Klaus et al. | |
| 4,457,231 A | * | 7/1984 | Kawaguchi | 101/248 |
| 4,782,717 A | * | 11/1988 | Becker | 101/248 |
| 4,787,261 A | * | 11/1988 | Becker | 101/248 |
| 5,048,362 A | | 9/1991 | Becker et al. | |
| 5,054,942 A | * | 10/1991 | Bernardis | 101/93.05 |
| 5,101,723 A | * | 4/1992 | Höll et al. | 101/148 |
| 5,306,096 A | * | 4/1994 | Tüns et al. | 101/216 |
| 5,967,043 A | | 10/1999 | Mayr | |
| 6,360,664 B1 | * | 3/2002 | Göttling | 101/486 |

FOREIGN PATENT DOCUMENTS

| | | |
|---|---|---|
| DE | 30 46 989 A1 | 7/1982 |
| DE | 30 46 989 C3 | 11/1987 |
| DE | 38 20 026 A1 | 12/1989 |
| DE | 42 31 673 A1 | 3/1994 |
| DE | 197 19 305 A1 | 11/1998 |
| DE | 199 19 733 A1 | 11/1999 |
| GB | 2 271 082 A | 9/1993 |

* cited by examiner

*Primary Examiner*—Eugene H. Eickholt
(74) *Attorney, Agent, or Firm*—Jones, Tullar & Cooper PC

(57) ABSTRACT

A fixing devise is disclosed. It is usable for clamping two radially displaceable elements.

9 Claims, 5 Drawing Sheets

FIXING DEVICE

FIELD OF THE INVENTION

The present invention is directed to a fixing device or coupling. The fixing device or coupling is usable for connecting two components that can be displaced with respect to each other in an adjusting device.

BACKGROUND OF THE INVENTION

A plurality of rollers are typically provided in conventional printing presses, such as web-fed rotary printing presses. Inking rollers in particular are provided, and are used for transferring ink from an ink reservoir to the plate cylinders of the printing press. It is possible to meter the amount of ink which is transferred to the plate cylinders by use of the inking rollers, so that the ink is transferred in the form of a uniform film of defined thickness. It is possible to compensate for interferences, such as speed fluctuations and rotary oscillations, by the utilization of the metering capabilities of the inking rollers.

Dampening rollers can also be provided in the printing press. These dampening rollers typically transfer a dampening agent, for example water, to the printing group.

Roller pairs are often formed by rollers, which are in engagement with each other, and in which at least one of the rollers has a cylinder surface made of an elastic material. This elastic or resilient cylinder surface can be deformed, at least slightly, by the contact pressure of the opposite roller. The result of the elastic deformation of the roller surface is a contact area which extends in a straight line between the rollers and which is called a contact strip. The width of the contact strip can be varied by setting the contact pressure between the rollers. The width of this contact strip has a considerable effect on the result of the printing. If, for example, the contact strip in an inking unit is too narrow, not enough ink is transferred. In those cases in which the contact strip is too wide, the elastic roller can be damaged by flexing occurring because of the excess contact pressure.

In order to be able to correctly set the strip width, in particular as a function of the respective operating conditions, for example as a function of the temperature of the printing press, or the amount of its wear, it is necessary to support at least one roller of the pair adjustably, so that the adjustably supported roller can be pushed with an adjustable force by an actuator in the direction of the opposite roller. Once the correct contact pressure between the two rollers has been established, a fixing device or coupling which is usable for securing the first roller in place, with respect to the second roller, is operated for permanently maintaining the contact pressure.

A device for setting the contact pressure between two rollers is known from DE 197 19 305 A1. In the seating arrangement described in that document, the adjustably supported roller is pushed against the opposite roller by a spring which is supported on the frame of the printing press. A defined contact pressure between the two rollers, as a function of the respectively selected characteristic spring curve, always occurs because of the use of such a spring. A clamping mechanism with a clamping lever and a clamping plate for fixing the roller in the position where it is pressed against the other is described, by use of which the roller shaft can be fixed in place on the frame by a frictional connection.

A device for the semi-automatic adjustment of rollers is known from DE 199 19 733 A1. In this device, the adjustably seated roller is maintained in a roller support, which, in turn, is seated on a frame support that is arranged, fixed in place, on the frame. In this case, the roller support and the frame support can be adjusted in relation to each other and are connected with each other by resilient springs. The resilient springs are provided with a defined prestress, so that the roller, which is adjustably seated on the roller support, can be pressed against the opposite roller with a defined contact pressure. Arresting bolts, by use of whose feed movement the roller support can be frictionally clamped to the frame support, are provided for arresting the roller support on the frame support.

DE 42 31 673 A1 describes a device for roller adjustment. A roller is first displaced in a radial direction by use of a pressure chamber and thereafter is fixed in place.

DE 30 46 989 C3 discloses a device for bringing an impression cylinder into a printing or non-printing position. In the course of this movement, the rotary movement of a synchronous spindle is fixed by a multiple disk brake.

SUMMARY OF THE INVENTION

The object of the present invention is directed to providing a fixing or coupling device.

In accordance with the invention, this object is attained by providing a fixing device or coupling usable with at least two components which can be displaced with respect to each other in an adjusting device. One element of the coupling is connected with one component and at least another element is connected with the second component. The two elements can be brought into a fixing or locking engagement with each other by friction. The coupling has a plurality of interengaging lamella elements which are alternatingly connected to the first and second elements of the fixing or coupling device. Each lamella has a friction face that is engageable with a friction face of an adjacent lamella element. The lamella elements can be clamped against each other. The lamella element can be moved in relation to each other in a translatory manner in a plane defined by the friction faces.

The advantages obtainable by the present invention consist, in particular, in that such a fixing or coupling device can be produced in an extremely compact and therefore space-saving manner. This is achieved in that, for fixing the displaceable components in place in relation to each other, several lamella elements are frictionally clamped. By arranging several, and in particular a multitude of such lamella elements one behind the other, the frictional force required for fixation is distributed over a multitude of frictional faces between the multitude of lamella elements. By clamping the lamella elements arranged one behind the other, the clamping face acts oppositely at all frictional faces.

Suitable lamella elements, which are usable in the subject fixing or coupling device, are known, for example, from lamella couplings which are employed for the frictional connection of rotatably seated shafts. In contrast to previously known lamella couplings, the lamellas of the present invention are displaceable in respect to each other in the fixing or coupling device in at least one direction and can be displaced within a defined adjusting range, depending on the play between the components of the fixing device, and can thereafter be fixed in place. The adjusting movement therefore does not take place in the manner of a pivoting or of a rotary movement, as in connection with the prior lamella coupling, but takes place in the manner of a translatory movement in the plane defined by the orientation of the frictional faces of the lamella elements.

Basically all elements or structures can be used as the clamping device, by use of which the lamellas can be clamped to each other by the exertion of a sufficient contact pressure. It is particularly advantageous for the clamping device to be designed in the manner of a prestressed spring element. In the position in which the fixing device or coupling is fixed in place, a spring force of such a size is exerted on the lamella elements by the prestressed spring element, that they are dependably fixed against each other by a frictional connection. An unintentional release of the fixing device, for example in the case of the loss of an energy supply, occurrence which raises a serious concern in connection with other clamping devices, is prevented because of this. For releasing the clamping device to accomplish an adjusting the components of the fixing device or coupling, it is necessary, in this embodiment of the present invention, to provide an actuator at the fixing device, by use of which actuator the spring element can be compressed to such an extent that the lamella elements can be relaxed, and therefore can be displaced with respect to each other.

In principle, any desired drive mechanisms can be employed for use in actuating the spring elements. For example electrically, hydraulically or pneumatically operating systems can all be used. It is particularly advantageous for the actuator to be configured in the manner of a punch, which is displaceably arranged in a pressure chamber. By charging the pressure chamber with a pressure medium, such as, for example, compressed air or hydraulic fluid, the punch can be displaced against the spring force of the spring element, so that the lamella elements are relaxed as a result of this punch displacement.

An advantage of the arrangement for setting the contact pressure between rollers in accordance with the present invention moreover lies in the very compact structure, which is made possible by the contemplated construction. As known from the prior art, one roller of a roller pair is typically fastened on a roller support, which, in turn, is displaceably maintained on a frame support. In turn, the frame support can either be fastened fixed in place on the frame of the printing press or, alternatively, the frame support can be supported on appropriate actuating devices which are used, for example, for placing the roller that is maintained in the support in contact with or out of contact from the oppositely located roller.

A recess is provided on the roller support, or on the frame support, which recess is engaged by a section of the frame support, or of the roller support. The dimensions of the section or of the recess have been selected to be such that a gap is formed between the recess and the section, by use of which gap, the adjustment range between the roller support and the frame support is defined. The roller support can be displaced relative to the frame support inside this gap. In order to be able to provide the adjusting force required for the adjusting movement, or in order to be able to press the first roller against the oppositely located roller with a defined contact pressure, at least one actuator is arranged in the gap, which at least one actuator exerts a pulling and/or a pressure force on the roller support, in the process of which, the roller support is supported on the frame support. Extremely compact components can be provided by reason of the arrangement of the actuator in the gap between the roller support and the frame support. In this context, it is not significant whether the recess is provided on the frame support or on the roller support, so that in principle, both configurations are alternatively capable of being used.

The shape of the recess and of the section engaging it basically can be as required, and can be matched to the respective intended use. It is thus possible for the recess to be embodied right-angled and having a play, in respect to the section engaging it, in only one direction. As a result, the roller support can only be displaced in one adjusting direction. However, if selective displacement of the roller support in different directions is desired, for example because the roller seated in the roller support must be selectively placed against several rollers, it is particularly advantageous if both the recess and the section are rotationally symmetrical, so that a revolving gap is formed between them. It is possible, because of this, to allow the roller support to be displaced in the adjusting plane in different adjusting directions in relation to the frame support. The adjusting range of the adjusting movement is limited by the width of the revolving gap.

If the roller support can be adjusted in different adjusting directions in relation to the frame support, for example over an entire adjusting plane, several actuators are required for providing the needed adjusting movement. Thus, in accordance with a preferred embodiment of the present invention, at least three actuators are arranged in the gap between the roller support and the frame support. The roller can be pushed in respectively different directions. By an appropriate selection of the forces exerted by the respective actuators, it is possible to exert a resultant force directed in any desired direction on the roller support, and therefore on the roller seated in the roller support, by the combined control of the different actuators. In this case, the actuators are preferably distributed in a star pattern in the gap between the roller support and the frame support. If four actuators are arranged opposite each other in the gap, it is possible to dependably prevent the tilting of the actuators, since by operation of the drive mechanism of one actuator the respectively oppositely located actor is compressed.

How the actuators are constructed is, in principle, widely selectable. Thus, electrically or piezo-electrically operating systems are possible. It is particularly advantageous if the actuator is embodied in the manner of a pressure element, which can be charged by a pressure medium. If a hydraulic oil is used as the pressure medium, it is possible by to apply very high pressures with correspondingly great adjusting forces.

In accordance with a preferred embodiment of the present invention, a precompressed gas, and in particular compressed air, is used. Since gases are compressible, an elastic spring effect results from the use of a precompressed gas and acts between the frame support and the roller support. By use of this spring effect it is possible to compensate for mechanical disturbances caused, for example, by unbalanced masses or out-of-round conditions. Furthermore, compressed air as an energy transfer source is available in most printing presses.

The arrangement for adjusting the contact pressure between the displaceably seated roller and an oppositely located roller can also be used for placing the displaceably seated roller into contact or out of contact with the other roller. For this purpose, it is necessary to select the adjusting range between the frame support and the roller support to be sufficiently large to be able to perform the adjusting movement necessary for the removal of the one roller out of contact with the other. Furthermore, for performing such an adjusting movement, the actuator between the frame support and the roller support must be suitably selected. To be able to perform the placement into and out of contact independently from the actuation of the arrangement, it is advantageous for the arrangement to be fastened on an additional out-of-contact device. For example, this out-of-contact device can be embodied in the manner of a pivot arm, by use of which the frame support can be pivoted in relation to the frame of the printing press between a contact position and an out-of-contact position.

The compactness of the device, as a whole, can be further increased by arranging a fixing device in an arrangement for adjusting the contact pressure between two rollers.

To this end, it is particularly advantageous if the fixing device extends along the center axis of the device coaxially in respect to the longitudinal axis of the roller seated on the roller support.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
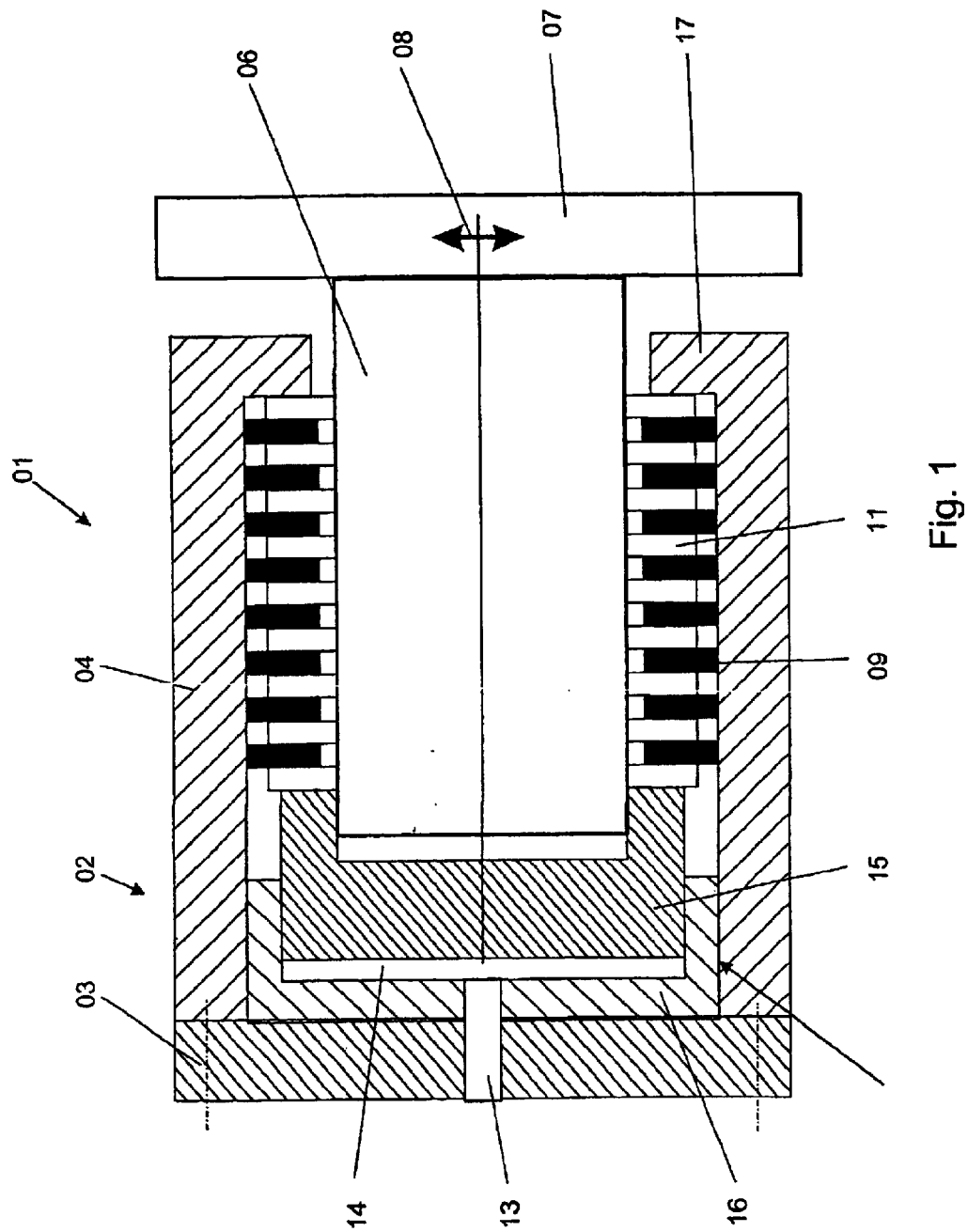
FIG. 1, a schematic of a first preferred embodiment of a fixing device or coupling, in accordance with the present invention, in cross section, in FIG. 2, a schematic cross-sectional view of an arrangement for adjusting the contact pressure between two rollers with a fixing device, in FIG. 3, the arrangement schematically represented in cross section in FIG. 2 in a base position, in FIG. 4, the arrangement schematically represented in cross section in FIG. 2 in a deflected position, in FIG. 5, the arrangement in accordance with FIG. 2 in a perspective plan view from the front, and in FIG. 6, a second preferred embodiment of an actuator for the arrangement in cross section.

Referring initially to FIG. 1, there may be seen generally at 01 a first preferred embodiment of a fixing device, or coupling in accordance with the present invention. The fixing device 01 represented in FIG. 1 has a first element, for example a base body 02 which is formed by a cover 03 and a sleeve 04. Fixing device 01 further includes a second element, which is displaceably seated in the sleeve 04, for example a bolt 06, on whose exterior end face a fastening plate 07 is provided. The first element or base body 02 of the fixing device or coupling 01 can be fastened to a frame, for example, while a roller lock for seating a roller, for example, can be screwed to the fastening plate 07 of the second element or bolt 06 of the fixing device or coupling 01.

The bolt 06 has a defined radial play or space with respect to the sleeve 04, so that the bolt 06 can be displaced relative to the base body 02, in desired adjusting directions, as indicated by arrow 08, in an adjusting plane that, as depicted in FIG. 1, is extending perpendicularly to the drawing plane. Because of this radial play, the fastening plate 07 can be displaced, for example upward or downward, in the direction of the movement arrow 08. However, because of the circularly symmetrical embodiment of the fixing device or coupling 01 depicted in FIG. 1, it is also possible to perform adjusting movements in any desired direction within the adjusting plane. Lamella elements 09 are fastened, at equidistant spacings, on an interior surface of the sleeve 04, which sleeve lamella elements interdigitate with or mesh with bolt lamella elements 11 that are fastened to the circumferential surface of the bolt 06, as seen in FIG. 1. In this case, contact faces between the sleeve and bolt lamella elements 09, 11 extend in planes which are parallel with the adjusting plane of the possible adjusting movements. In the course of the displacement of the bolt 06 in relation to the base body 02, the sleeve lamella elements 09 slide along the bolt lamella elements 11, wherein the adjusting movement is limited by the play between the bolt 06 and the base body 02.

A clamping device 12 with a pressure punch or piston 15, which piston 15 is displaceably seated in a pressure cylinder 16, is provided for fixing the fixing device or coupling 01 in place in a defined position. A pressure chamber 14 can be charged with a pressure medium, for example hydraulic oil or compressed air, through a connector 13, so that the pressure punch or piston 15 is pushed in the direction of the lamella elements 09 or 11 in the pressure cylinder 16. As a result, the lamella elements 09, 11 are clamped between the piston 15 of the clamping device 12 and an end stop 17 which is formed on the sleeve 04. As soon as the surface pressure between the pressure punch or piston 15 and the front lamella element 11 exceeds a defined pressure, the individual first and second lamella elements 09, 11 come into frictional contact with each other and a frictional adhesion state is established. The bolt 06 is now fixed in place axially relative to the base body 02.

Figure 2:
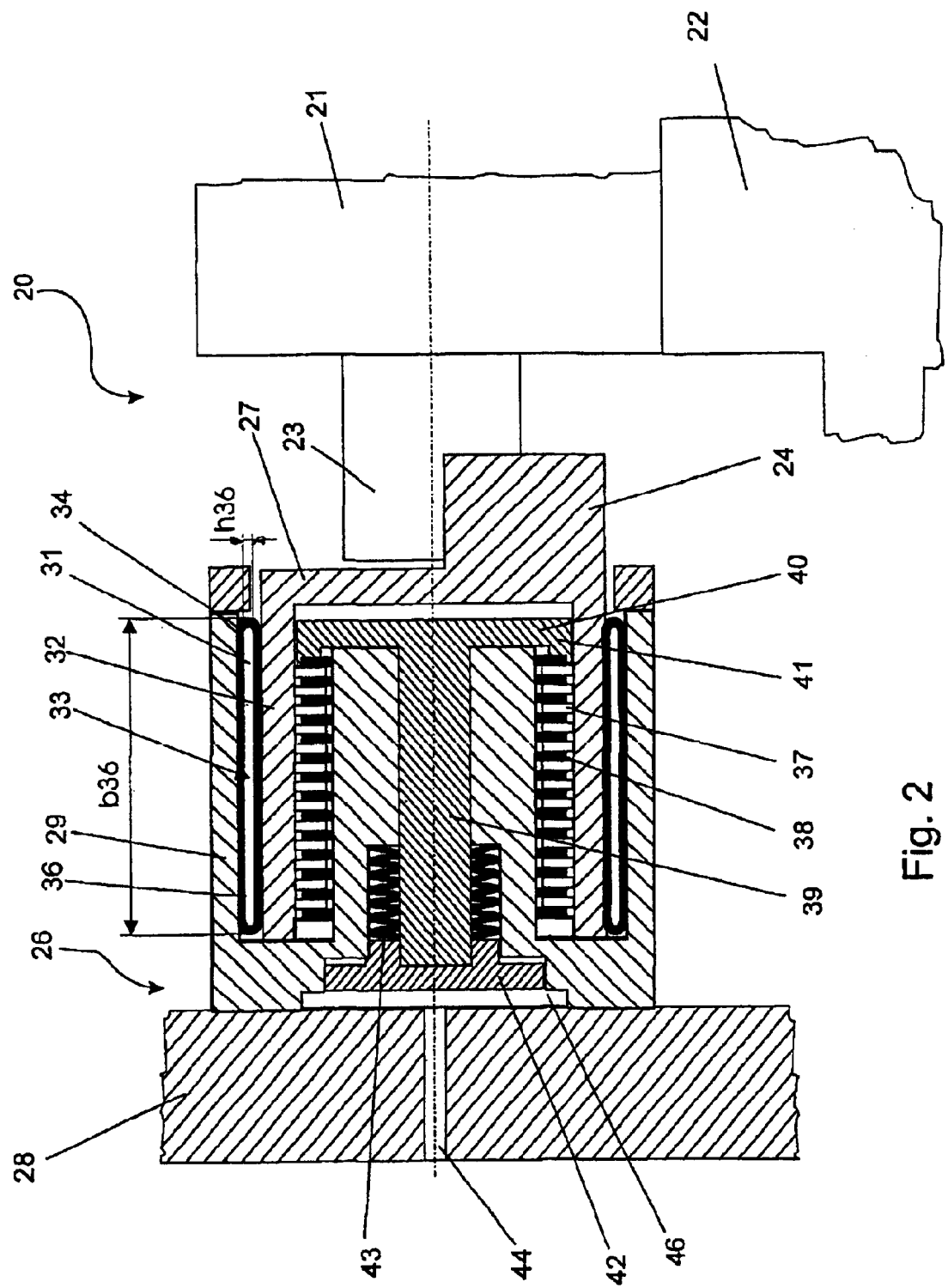

An arrangement 20 for adjusting the contact pressure between a first roller 21 and a second roller 22, and which utilizes the fixing device or coupling of the present invention is represented in FIG. 2. The first roller 21 can be releasably fastened, by the ends of its shaft 23, on a snap closure 24 provided on the arrangement 20. Such snap closures 24 are generally known in the art and have a semicircularly shaped bearing shell, into which the ends of the roller shaft 23 can be inserted. By attaching an upper bearing shell, which is not specifically represented in FIG. 2, the roller shaft 23 can then be secured on the snap closure 24.

The arrangement for adjusting roller contact pressure 20 is substantially composed of a frame support 26 and of a roller support 27, which can be displaced relative to each other in an adjusting plane extending perpendicularly in respect to the drawing plane. The frame support 26 is put together from a base plate 28, which can be pivotably fastened on the frame of the printing press, for example by the use of a pivot arm, and a sleeve body 29. On its side facing the roller 21, the sleeve body 29 has a recess 31, which is engaged by a cylindrically shaped section 32 of the roller support 27. In this case, the interior diameter of the recess 31, or the exterior diameter of the section 32, have been selected in such a way, that a gap 33, which is circular-cylindrical in the base position and has a gap width of approximately 1 mm to 10 mm, in particular 2 mm, is formed. The maximum adjustment range for displacing the roller support 27 is relation to the frame support 28 is defined by the gap 33.

Figure 5:
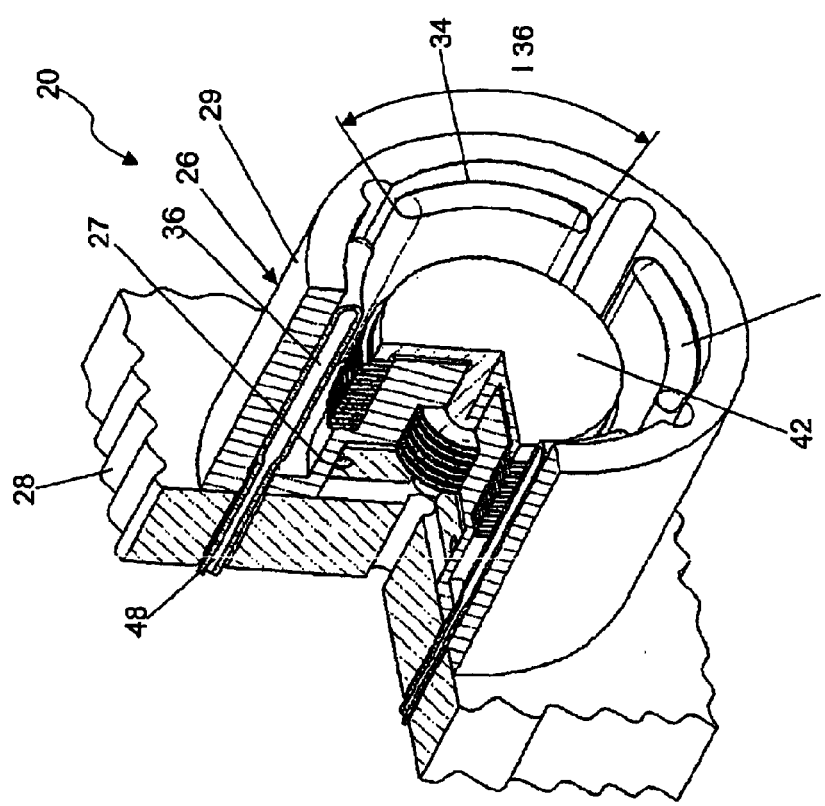

In order to be able to provide the adjusting movements required for setting the roller 21, or to be able to exert the desired contact pressure between the roller 21 and the roller 22, a total of four actuators 34, which are structured in the manner of pressure hoses, are distributed over the circumference of the gap 33. Only two of these four actuators 34 have been represented in cross section in FIG. 2. The pressure chambers 36 formed by the walls of the actuators 34 can be charged with a fluid under pressure via feed lines 48, as can be seen in FIG. 5, but which are not represented in FIG. 2. A force acts on the roller support 27, which results from the pressure conditions existing in the four actuators 34, so that the first roller 21 can be pressed against the second roller 22 with the desired contact pressure by the utilization of an appropriate control of the actuators 34.

Since the fluid pressure cushion, which is present in the actuators 34, is compressible, randomly occurring mechanical disturbances can be cushioned by the resultant spring effect.

A height h36 in the radial direction of the first roller 21 of the pressure chamber 36 of the arrangement 20 is less than a width b36 of the pressure chamber 36 in the axial direction of the roller 21 and/or a circumferential length l36 of the pressure chamber 36 in the circumferential direction of the roller 21, as can be seen in FIG. 5.

The ratio of the width b36 and/or the length l36 of the pressure chamber 36 to the height h36 of the pressure chamber 36 is greater than 3, and in particular is greater than 5.

Lamella elements 37, which are secured to the cylindrically shaped section 32 of roller support 27, are arranged to mesh with lamella elements 38 which are fastened on the sleeve body 38 and together constitute a lamella package. This lamella package is used for fixing the roller support 27 in place in relation to the frame support 26. A punch or piston 39, which is T-shaped in cross section, and whose circular punch or piston head 40, which is provided with a circular-shaped flange 41, comes to rest against the outermost lamella element 38 of the lamella package. Punch or piston 39 is provided for the frictional clamping of the lamella package that is formed by the lamella elements 37 and 38. A pressure plate 42, on which the spring force of a spring element 43, that is embodied in the manner of a plate spring package, acts, is fastened on the opposite end of the punch or piston 39. The spring element 43 is mounted under prestress between the pressure plate 42 and the sleeve body 29, so that the lamella package formed by the lamella elements 37 and 38 is clamped by the spring force, which is transmitted by the punch or piston 39 to the lamella elements 37, 38.

For displacing the roller support 27 relative to the frame support 26, and in particular when adjusting the contact pressure between the rollers 21, 22, it is necessary to release the fixing device or coupling that is constituted by the lamella elements 37, 38, or the punch or piston 39 and the pressure plate 42. A pressure connection 44 is provided in the base plate 28 for this purpose. A pressure chamber 46 located between the pressure plate 42 and the base plate 28 can be charged with a pressure medium, such as, for example compressed air. As soon as the air pressure acting on the pressure plate 42 exceeds the spring force of the spring element 43, the flange 41 of the head 40 of the punch or piston 39 is lifted off the ends of the lamella elements 38 sufficiently far so that they are no longer frictionally clamped with the lamella elements 37 and can be displaced in relation to each other.

The adjustment of the contact pressure between the rollers 21, 22 is, for example, performed in the following manner. First, the pressure chamber 46 is charged with sufficient fluid under pressure so that the lamella elements 37, 38 are no longer frictionally clamped. Subsequently, the actuators 34 are each charged with just enough pressure, so that the desired contact pressure between the rollers 21, 22, or between the roller 21 and other rollers, not specifically represented in FIG. 2, is generated and results in a contact strip of the desired width. As soon as the correct adjustment of the desired contact pressure between the rollers 21, 22 has been established, the fluid pressure in the pressure chamber 46 is relieved. The punch or piston 39, now clamps the lamella elements 37, 38 together, so that the roller support 27 is fixed in the desired position with respect to the frame support 26. The pressure in the actuators 34 is relieved at the end of the operation.

Figure 3:
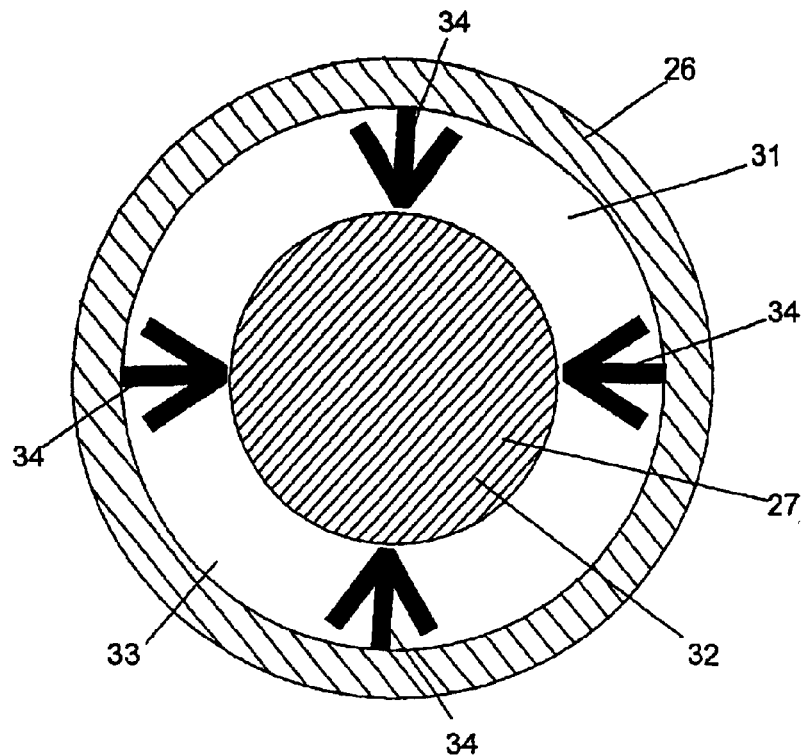
Figure 4:
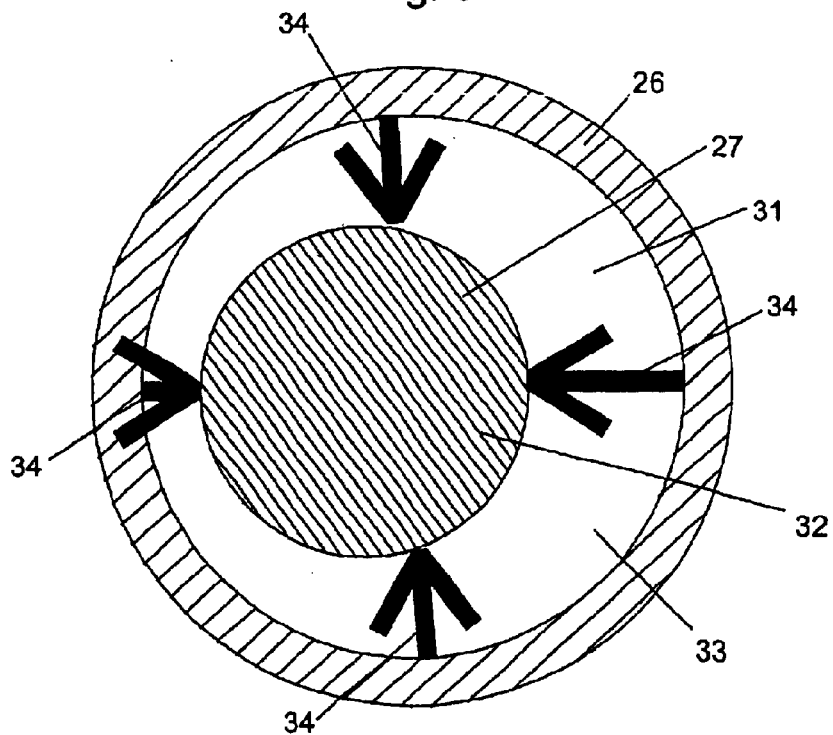

The principle of the operation of the arrangement 20, in the course of the required roller contact pressure varying is adjusting movement, is shown schematically in FIGS. 3 and 4. FIG. 3 shows the frame support 26 with the recess 31 and the section 32 of the roller support 27 engaged in it. By selection of the dimensions between the frame support 26 and the section 32 of the roller support 27 a gap 33 is formed, in which the actuators 34, which are indicated only schematically in FIGS. 3 and 4 by force arrows, are arranged. The possible adjusting movements between the frame support 26 and the roller support 27 are defined by an adjusting plane which, in the representations of FIGS. 3 and 4, extends in the drawing plane, wherein the adjusting range of the adjusting movement is limited by the width of the gap 33.

As represented in FIG. 4 by way of example, the roller support 27 and, as a result thereof the roller 21 fastened on it, can be laterally offset in relation to the frame support 26, which offset is caused by an appropriate control of the actuators 34 and the force effect on the section 32 arising from this. As soon as the desired position of the roller support 27, in relation to the frame support 26, has been established, the fixing device or coupling, which is constituted by the lamella elements 37, 38, or the punch or piston 39 and the pressure plate 42 can be actuated, so that the position is permanently fixed and the actuators 34 need no longer be operated.

FIG. 5 shows the arrangement 20 with the base plate 28, the frame support 26, the roller support 27 and the actuators 34 in a perspective plan view from the front. The four actuators 34, which are embodied in the manner of pressure hoses and which can be charged with compressed air via feed lines 48, are arranged between the sleeve body 29 of the frame support 26 and the roller support 27, on whose side facing the front the half-shell-shaped snap closure 24 can be partially seen. The lamella elements 37, 38, which are not specifically numbered here, can be relaxed with the aid of the pressure plate 42. The extremely compact structure of the arrangement 20 can be seen which, because of its rotationally symmetrical structure, except for the base plate 28, has a lesser diameter than that of the roller 21 itself, as can be seen in FIG. 2.

Figure 6:
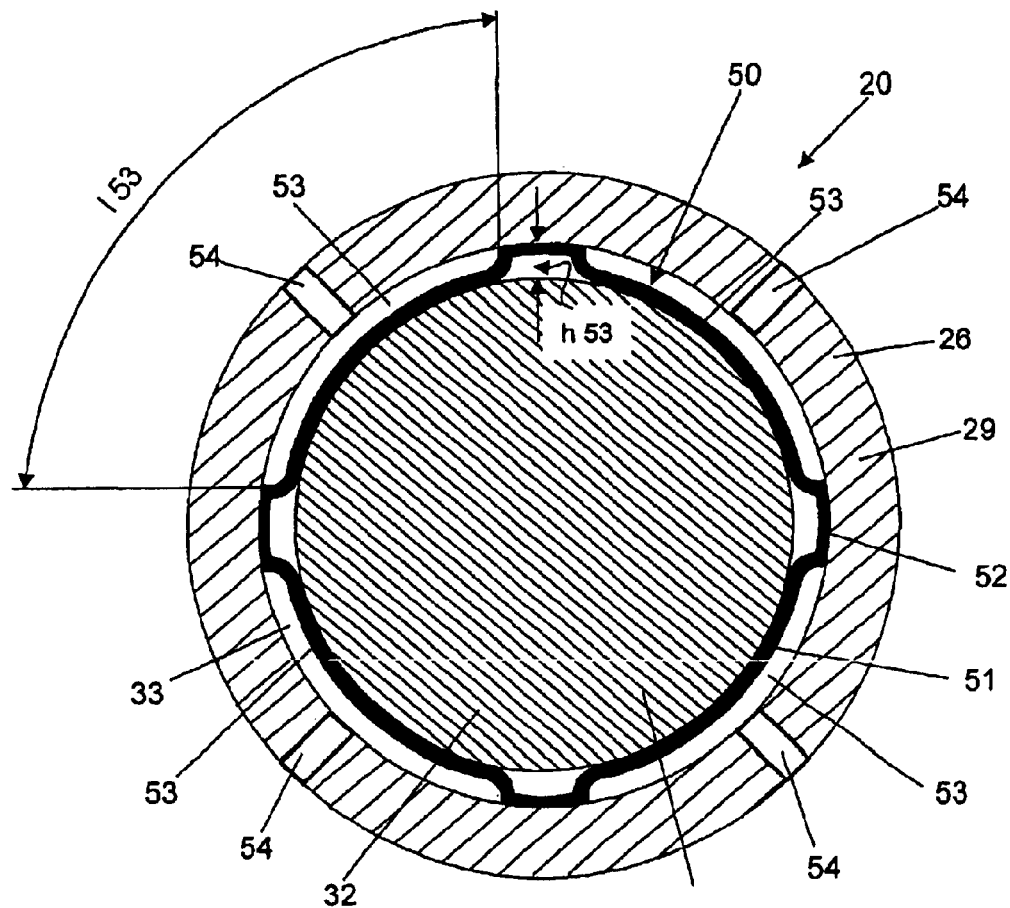

FIG. 6 shows a second embodiment of an actuator 50 for an arrangement 20 for adjusting contact pressure in accordance with the present invention in cross section. The principal construction of the arrangement 20 with a frame support 26, a roller support 27 and a fixing device or coupling for fixing the roller support 27 in place in relation to the frame support 26 corresponds to the construction described by reference to FIG. 2 and therefore needs not be further described again. A cylinder-shaped diaphragm 51, whose upper and lower edges are connected with the interior diameter of the sleeve body 29, which is not specifically represented in FIG. 6, is arranged in the gap 33. The diaphragm 51 is moreover connected with the interior diameter of the sleeve body 29, for example by being glued to it, in four strip-shaped areas 52, so that as a result four pressure chambers 53 are formed by the sleeve body 29, which pressure chambers 53 are evenly distributed over the circumference of the gap 33. The pressure chambers 53 can each be charged with compressed air via pressure inlet openings 54 so that, as a function of the respective pressure in the four pressure chambers 53, a resultant force acts on the section 32 of the roller holder 27.

The height h53 of the pressure chamber 53 of the arrangement 20 shown in FIG. 6 is less in the radial direction of the roller 21 than a width b53 of the pressure chamber 53 in the axial direction of the roller 21 and/or a length l53 of the pressure chamber 53 in the circumferential direction of the roller 21.

The ratio of the width b53 and/or the length l53 of the pressure chamber 53 to the height h53 of the pressure chamber 53 is greater than 3, and in particular is greater than 5.

While preferred embodiments of a fixing device in accordance with the present invention have been set forth fully and completely hereinabove, it will be apparent to one of skill in the art that various changes in, for example the overall sizes of the roller, the type of printing press in which they are used, and the like could be made without departing from the true spirit and scope of the present invention which is accordingly to be limited only by the following claims.

What is claimed is:

1. A fixing device comprising:

a first component;

a second component displaceable with respect to said first component and forming an adjusting device with said first component;

at least a first element of said adjusting device, said first element being connected with said first component;

a second element of said adjusting device, said second element being connected with said second component;

at least three sequentially arranged lamella elements connected in an alternating manner with said first and said second elements;

a friction face on each said lamella, said friction faces of said at least three lamella each being engageable with friction faces of adjacent ones of said lamella;

means for clamping said lamella elements together; and means supporting said lamella elements in a translatory manner in a plane defined by said friction forces.

2. The fixing device of claim 1 wherein said first and second elements are displaceable in respect to each other in said plane.

3. The fixing device of claim 1 wherein said means for clamping includes at least one prestressed spring element having a spring force acting on said lamella elements, and further including a detent, said lamella elements being clamped between said detent and said spring element, and further including an adjusting element adapted to compress said spring element to unclamp said lamella elements for displacement with respect to each other.

4. The fixing device of claim 3 wherein said spring element is a plate spring package.

5. The fixing device of claim 3 wherein said adjusting element includes a piston and a pressure plate supported in a pressure chamber, said adjusting element being displaceable in said pressure chamber against said spring element in response to charging of said pressure chamber with a pressure medium.

6. The fixing device of claim 1 wherein said lamella elements are a lamella package.

7. The fixing devise of claim 1 wherein said fixing device is circularly symmetrical and has a center axis and wherein said lamella elements are arranged axially symmetrical about said center axis.

8. The fixing devise of claim 1 further including a roller having a rotary shaft and wherein said lamella elements are arranged to fix said rotary shaft in place and are displaceable with respect to each other in a radial direction of said rotary shaft.

9. The fixing devise of claim 1 wherein said fixing device is arranged in a printing press.

* * * * *